United States Patent
Qiu et al.

(10) Patent No.: US 8,558,523 B2
(45) Date of Patent: Oct. 15, 2013

(54) SYSTEM AND METHOD OF INTERMITTENT DIODE BRAKING FOR MULTIPLE PHASE VOLTAGE REGULATOR

(75) Inventors: Weihong Qiu, San Jose, CA (US); Chun Cheung, Brooklyn, NY (US); Faisal Ahmad, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 466 days.

(21) Appl. No.: 13/047,378

(22) Filed: Mar. 14, 2011

(65) Prior Publication Data

US 2011/0241640 A1 Oct. 6, 2011

Related U.S. Application Data

(60) Provisional application No. 61/320,043, filed on Apr. 1, 2010.

(51) Int. Cl.
G05F 1/565 (2006.01)
G05F 1/59 (2006.01)

(52) U.S. Cl.
USPC .............................. 323/272; 323/285; 323/288

(58) Field of Classification Search
USPC .......... 323/268, 271, 272, 282, 283, 285, 288
See application file for complete search history.

(56) References Cited

U.S. PATENT DOCUMENTS

| | | | |
|---|---|---|---|
| 6,806,689 B2 * | 10/2004 | Schuellein et al. | 323/272 |
| 7,863,875 B1 * | 1/2011 | Guo et al. | 323/275 |
| 8,242,759 B2 * | 8/2012 | Carroll et al. | 323/272 |
| 2007/0229049 A1 * | 10/2007 | Zafarana et al. | 323/282 |
| 2008/0238392 A1 * | 10/2008 | Cheung et al. | 323/283 |
| 2009/0309564 A1 * | 12/2009 | Zafarana et al. | 323/282 |
| 2010/0327827 A1 * | 12/2010 | Moyer et al. | 323/272 |
| 2012/0081095 A1 * | 4/2012 | Kung | 323/285 |

OTHER PUBLICATIONS

"XPhase3™ Dual Phase IC." Data Sheet IR3527. International Rectifier. pp. 1-20. 2004.

* cited by examiner

*Primary Examiner* — Adolf Berhane
*Assistant Examiner* — Fred E Finch, III
(74) *Attorney, Agent, or Firm* — Gary Stanford

(57) ABSTRACT

A method of operating a regulator controller IC for performing intermittent diode braking for controlling a multiple phase voltage regulator. The method includes receiving at least one signal for detecting repetitive load transients, determining a rate of the repetitive load transients, generating diode braking control signals, each for applying diode braking to a corresponding one of multiple phases for at least one load transient when the repetitive load transients are below a first rate, and controlling the diode braking control signals to drop application of diode braking of at least one phase for at least one load transient when the repetitive load transients are at least the first rate. The method may include rotating the application of diode braking among the phases during successive applications of diode braking. The method may include dropping an increased number of phases for diode braking as the rate of repetitive load transients is increased.

25 Claims, 5 Drawing Sheets

SYSTEM AND METHOD OF INTERMITTENT DIODE BRAKING FOR MULTIPLE PHASE VOLTAGE REGULATOR

CROSS-REFERENCE TO RELATED APPLICATIONS

This application claims the benefit of U.S. Provisional Application Ser. No. 61/320,043, filed on Apr. 1, 2010, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
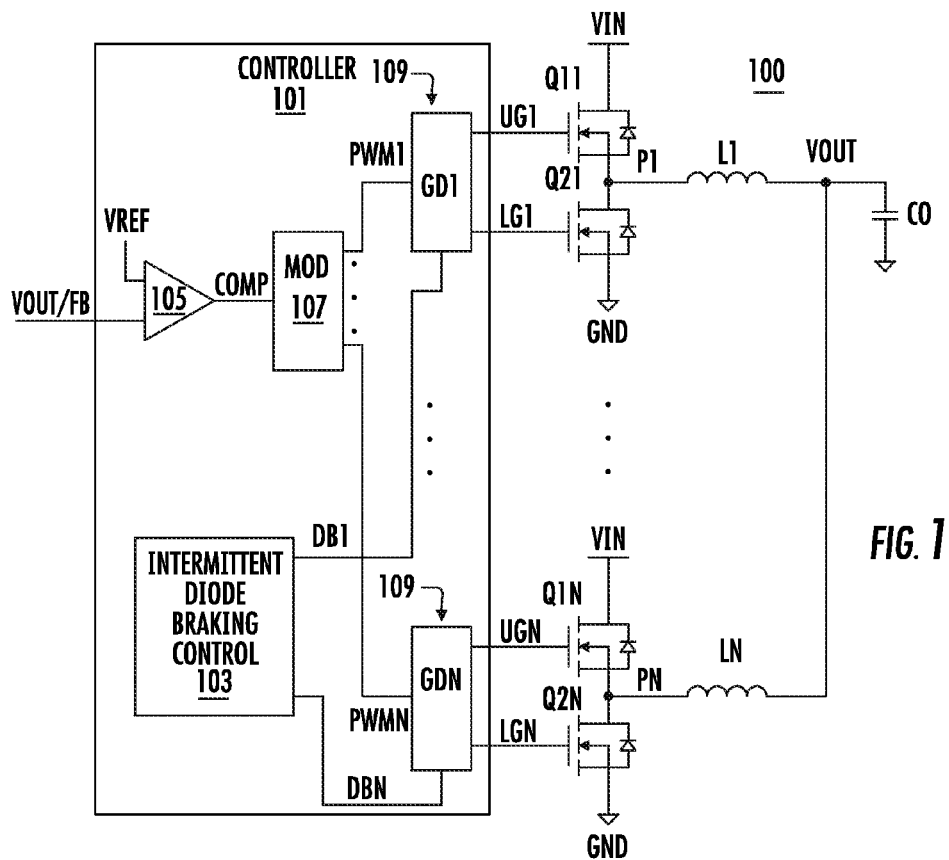
FIG. 1 is a simplified schematic and block diagram of a multiple phase (multiphase) voltage regulator including intermittent diode braking control implemented according to one embodiment.

FIG. 1 is a simplified schematic and block diagram of a multiple phase (multiphase) voltage regulator 100 including intermittent diode braking control implemented according to one embodiment. The voltage regulator 100 includes a regulator controller 101 and N phase circuits. Each phase circuit includes a pair of electronic switches coupled between an input voltage VIN and a reference voltage, such as ground (GND), with a corresponding intermediate phase node. Each phase circuit further includes an inductor coupled between a corresponding phase node and a common output node developing an output voltage VOUT. An output capacitor CO is coupled between VOUT and GND. In one embodiment, the regulator controller 101 is implemented on an integrated circuit (IC) or the like.

As shown, for example, the first phase circuit includes a first electronic switch Q11 having a drain coupled to VIN and a source coupled to a first phase node P1, and a second electronic switch Q21 having a drain coupled to P1 and a source coupled to GND. The first phase circuit further includes an inductor L1 coupled between P1 and VOUT. The voltage regulator 100 includes one or more additional phase circuits up to a last or Nth phase circuit, each configured in substantially the same manner. As shown, for example, the Nth phase circuit includes a first electronic switch Q1N having a drain coupled to VIN and a source coupled to an Nth phase node PN, and a second electronic switch Q2N having a drain coupled to N1 and a source coupled to GND. The Nth phase circuit further includes an inductor LN coupled between PN and VOUT. Although only the first and last phase circuits are shown, it is understood that any number of intermediate phase circuits may be included. Each electronic switch is shown as an N-channel metal-oxide semiconductor, field-effect transistor (MOSFET), although other types of electronic switches are contemplated, such as P-channel devices and the like.

The controller 101 is coupled to the gate of each of the electronic switches for turning them on and off according to pulse width modulation (PWM) control for converting the input voltage VIN to the output voltage VOUT. As shown, the controller 101 provides an upper gate signal UG1 to the gate of Q11 and provides a lower gate signal LG1 to the gate of Q21 for the first phase circuit. In a similar manner, the controller 101 provides an upper gate signal UGN to the gate of Q1N and provides a lower gate signal LGN to the gate of Q2N for the Nth phase circuit. Each phase circuit is coupled in substantially similar manner.

The voltage regulator 100 is configured as a multiphase buck-type regulator in which VIN is greater than VOUT. In the simplified illustration, the controller 101 includes an error amplifier 105, a modulator 107, and N gate drivers 109, individually shown as GD1, . . . , GDN. The error amplifier 105 amplifies a difference between VOUT or a version thereof, such as a voltage divided feedback signal FB, and a reference voltage VREF and outputs a compensation voltage COMP. VREF represents the target voltage level for VOUT or FB and COMP represents the error of VOUT. COMP is provided to the modulator 107, which develops N PWM control signals PWM1-PWMN, each for controlling operation of a corresponding one of the N gate drivers 109. Each gate driver 109 develops the upper gate UG and lower gate LG signals to the corresponding electronic switches of the corresponding phase. As shown, gate driver GD1 generates UG1 and LG1, and so on up to the last gate driver GDN, which generates UGN and LGN. The gate drivers 109 are shown implemented within the regulator controller 101, which may be incorporated onto a controller IC or the like. In an alternative embodiment, all or a portion of the gate drivers 109 are implemented external to the controller 101.

For any given phase, the upper electronic switch is activated or turned on by the controller 101 for coupling its phase node to VIN via the upper switch, and then the upper switch is turned off and the lower switch is turned on to couple the phase node to GND via the lower switch. When a new cycle is initiated according to PWM control, the lower switch it turned off and then the upper switch is turned back on (dead-time control ensures that both switches are not on at the same time). Operation toggles in this manner to perform voltage conversion as understood by those of ordinary skill in the art.

In one embodiment, the voltage regulator 100 is configured for low voltage, high current applications, such as loads including a central processing unit (CPU) (FIG. 7) and the like (not shown). Large voltage overshoot of VOUT may occur in response to a load release for such low voltage, high current applications. The voltage across the inductor Lx (x=1, . . . , N) for a given phase is the sum of the output voltage VOUT and the voltage drop across the corresponding lower switch Q2. When the lower switch is turned on, its voltage drop is relatively low given the relatively low drain-to-source on-resistance of the lower switch, referred to as $R_{DSON}$. The voltage drop is approximately $I_L \cdot R_{DSON}$, in which $I_L$ is the current through the corresponding output inductor. When the lower switch is turned off, its internal body diode is on with a typical voltage drop of about 0.7 Volts (V). A large voltage drop across the corresponding phase inductor can reduce the magnitude of the output voltage overshoot.

According to diode braking operation, the lower switch is turned off during a load release event so that the relatively high voltage drop across its body diode is applied to the output inductor to reduce the output voltage overshoot. The diode braking operation results in reduced output capacitance for a given output voltage overshoot specification. Diode braking, however, introduces extra power loss, $V_{BODY\_DIODE} \cdot I_L$ versus $V_{DSON} \cdot I_L$. For CPU Vcore applications, the load current may change at a relatively high repetitive rate. During high rate repetitive transient events, the additional diode power losses may cause a thermal problem. Assume, for example, that the diode is on (when lower switch is off) for a fixed amount of time ($T_{ON\_DIODE}$) during each transient event. Then the power loss of the diode ($P_{DIODE\_BRAKING}$) is proportional to the transient repetitive rate ($F_{LOAD}$) and the load step size ($I_{STEP\_LOAD}$) according to the following equation (1):

$$P_{DIODE\_BRAKING} = V_{DIODE} \cdot T_{ON\_DIODE} \cdot I_{STEP\_LOAD} \cdot F_{LOAD} \quad (1)$$

For a 20 Ampere (A) step load transient event at a load transient repetitive rate of 100 kilohertz (KHz), the extra power loss due to diode braking is about 1.5 Watts or more. Furthermore, at a relatively high transient repetitive rate, the frequency of switching of each of the lower switches is increased. It is desired to reduce the amount of power loss of diode braking and to minimize increases of switching frequency.

The load step size is reduced during a relatively high frequency transient repetitive rate resulting in reduced output voltage overshoot. Output voltage overshoot, however, is relatively severe for a low frequency transient repetitive rate, so that diode braking facilitates the reduction of extra power loss to acceptable levels. Further, at the relatively low frequency transient repetitive rate, the additional power loss is reduced thereby reducing or minimizing the thermal problem concern. The controller 101 includes an intermittent diode braking controller 103 controller 103 implemented according to one embodiment which operates diode braking at lower transient repetitive rate to reduce output voltage overshoot and which reduces application of diode braking at higher transient repetitive rate to reduce extra power losses.

The intermittent diode braking controller 103 controller 103 provides a diode braking signal DB to each of the gate drivers 109 for application of diode braking. As shown DB1 is provided to the gate driver GD1, and so on up to the last phase in which DBN is provided to the gate driver GDN. When asserted, each DB signal causes the corresponding gate driver to turn on the lower switch diode by turning off the lower switch for the duration of assertion of the DB signal. The simplified timing diagram of FIG. 6, further described below, illustrates intermittent diode braking for two phases controlled by PWM signals PWM1 and PWM2 in which a corresponding controller provides lower gate drive signals LG1 and LG2. As shown, when the PWM1 and PWM2 signals are asserted high, the LG1 and LG2 signals are low turning off the lower switches. When the PWM1 and PWM2 signals are de-asserted low, the LG1 and LG2 signals are normally asserted high turning on the lower switches during normal operation.

When a diode braking enable signal DB_EN is asserted high, however, at least one of the LG1 and LG2 signals are pulled low according to diode braking operation. As shown, at time t1 DB_EN goes high when LG1 and LG2 were both high, yet LG1 is pulled low for diode braking for phase 1. With reference to FIG. 1, this corresponds with the DB1 signal going high for the duration of DB_EN to pull LG1 low for about the same duration. According to normal diode braking, LG2 would also go low during the same time period. According to intermittent diode braking, LG2 stays high at time t1. In the next cycle when DB_EN goes high, LG1 remains high while LG2 goes low for the duration of the DB_EN pulse.

Figure 2:
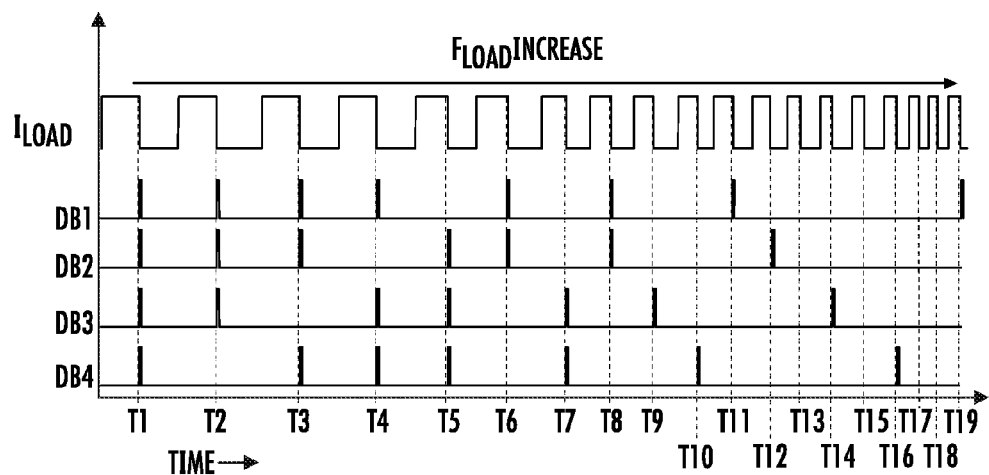
FIG. 2 is a timing diagram illustrating operation of the intermittent diode braking control block of FIG. 1 for four phases.

FIG. 2 is a timing diagram illustrating operation of the intermittent diode braking controller 103 for the voltage regulator 100 with four phases (e.g., N=4). Load current $I_{LOAD}$ is plotted first (at top) followed by four diode braking control signals DB1, DB2, DB3 and DB4. An arrow above the plot of $I_{LOAD}$ indicates the direction of increase of the frequency of load current events, or $F_{LOAD}$ INCREASE. A pulse for each phase means that the lower switch is turned off for at least the duration of the pulse indicating diode braking application. As shown, the load current $I_{LOAD}$ toggles between high load and low load beginning at a lower frequency which increases over time to a higher frequency. A transition from high load to low load is a load release event. At time t1 diode braking is applied for all four phases in response to a load release event as shown by a pulse for each phase. At times t2-t5, diode braking is reduced to three phases as the frequency of the load transients increases. The omitted phase cycles through the phases, such that diode braking occurs for phases 1, 2 and 3 at next time t2 (phase 4 omitted), for phases 1, 2 and 4 at next time t3 (phase 3 omitted), for phases 1, 3 and 4 at next time t4 (phase 2 omitted), and for phases 2, 3 and 4 at next time t5 (phase 1 omitted). Operation repeats in this manner if the frequency of the load transients remains within this frequency range.

Diode braking is reduced to two phases for subsequent times t6-t8 as the frequency of the load transients increases. As shown, diode braking occurs only for phases 1 and 2 at time t6, only for phases 3 and 4 at time t7, and only for phases 1 and 2 at time t8. Operation repeats in this manner if the frequency of the load transients remains within this frequency range. In alternative embodiments, the pairing of phases may be modified. For example, diode braking may be only for phases 1 and 3 followed by diode braking for phases 1 and 4 (pairing phases 1&3 and 2&4) within this frequency range. The groupings of phases may also be modified for a different number of phases.

Continuing with the four phase example as illustrated in FIG. 2, diode braking is reduced to one phase at each of subsequent times t9-t12 as the frequency of the load transients continues to increase, in which diode braking cycles through phases 3, 4, 1, and 2, for times t9, t10, t11 and t12, respectively. In this case, diode braking is further reduced to every other load release event as the frequency of the load transients continues to increase beginning at time t13, at which time diode braking is not applied for any phase. As shown, diode braking occurs only for phase 3 at next time t14, is skipped at next time t15, and occurs only for node 4 at next time t16. As the frequency of the load transients continues to increase, diode braking continues to be reduced, such as to every third load release event beginning at time t17. Although not explicitly shown in FIG. 2, diode braking may be stopped altogether when the frequency of the load transients reaches a predetermined high frequency and for so long as the frequency remains at or above the predetermined high frequency.

Figure 3:
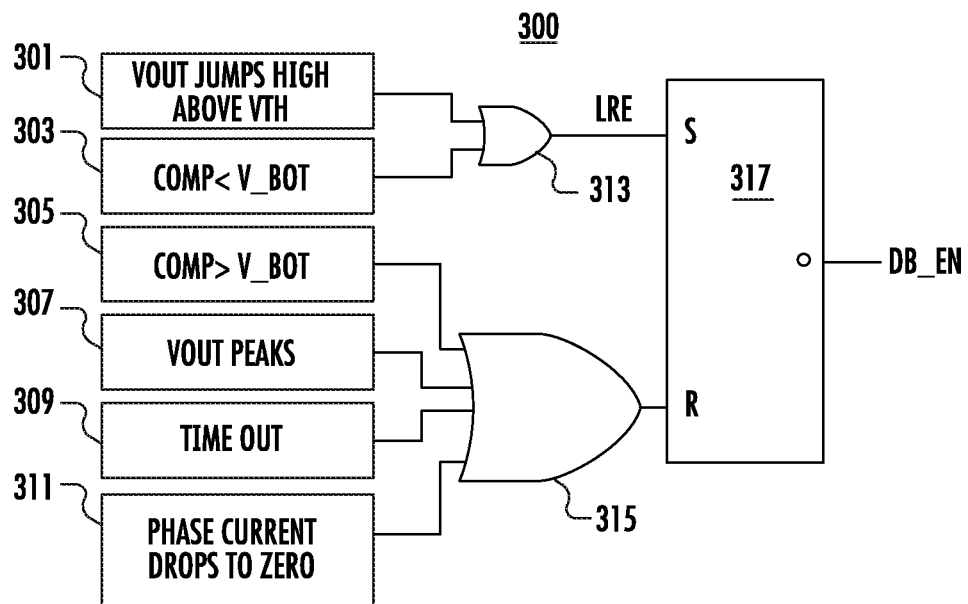
FIG. 3 is a schematic and block diagram of a transient detector according to one embodiment for use within the intermittent diode braking control block of FIG. 1.

FIG. 3 is a schematic and block diagram of a transient detector 300 according to one embodiment for use within the intermittent diode braking controller 103. When VOUT jumps high as determined at block 301, or when a compensation voltage COMP falls low as determined at block 303, then OR gate 313 detects a load release event (LRE) by asserting its output high which sets a set-reset (SR) flip-flop (FF) 317 thus pulling the diode brake enable DB_EN signal high. In one embodiment as shown at block 301, when VOUT jumps high above a predetermined voltage threshold VTH, then the output of OR gate 313 goes high pulling DB_EN high. In an alternative embodiment, the load release event is detected when VOUT increases by a threshold voltage amount (e.g., change of VOUT by a threshold amount) rather than to a predetermined threshold voltage. COMP is also compared by a threshold amount to identify a load release event. In one embodiment as shown at 303, when COMP falls below the bottom voltage level V_BOT (COMP<V_BOT) of a ramp control signal (not shown), then the output of OR gate 313 goes high pulling DB_EN high.

After the SRFF 317 is set, it is reset to pull DB_EN low. In one embodiment, when COMP goes above V_BOT as determined at block 305 (COMP>V_BOT), or when VOUT reaches a peak level as determined at block 307 (VOUT PEAKS), or upon a time out condition as determined at block 309, or when phase current drops to zero (0) as determined at block 311, then OR gate 315 resets the SRFF 317 which pulls DB_EN low. Each of these conditions indicate that the voltage regulator 100 has responded to the load release event or that a maximum diode braking period has been reached. The time out condition indicated at block 309, for example, indicates a maximum duration of diode braking.

Other methods may be used to detect release of load transients (or application of load events). Detection of output inductor current may be unreliable since inductor current may be slow in responding to load current changes. Load current detection is not always readily available and is not always easy to sense. Monitoring output voltage VOUT and/or the compensation voltage COMP are relatively easy and reliable methods for detecting transient events.

In general, the DB_EN signal represents the occurrence of load transient events. In the illustrated embodiment, the transient detector 300 detects load release events for application of diode braking. The DB_EN signal pulses high for each load release, the duration of each DB_EN pulse indicates a duration of diode braking application, and the rate or frequency of toggling of the DB_EN signal indicates the repetition rate of load transient events.

Figure 4:
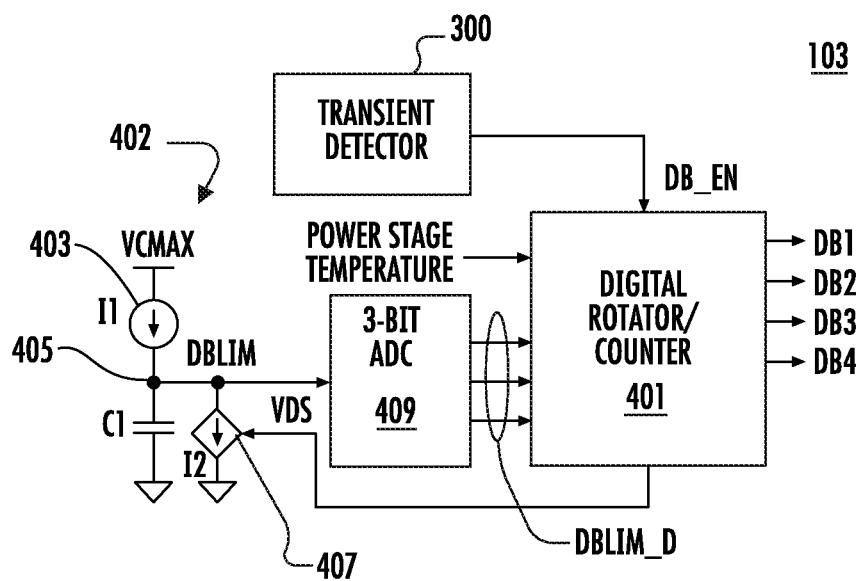
FIG. 4 is a more detailed schematic and block diagram of the intermittent diode braking control block of FIG. 1 according to one embodiment.

FIG. 4 is a more detailed schematic and block diagram of the intermittent diode braking controller 103 according to one embodiment. The intermittent diode braking controller 103 includes the transient detector 300, a diode braking controller implemented as a digital rotator/counter block 401, a charging circuit 402, and a analog to digital converter ADC) 409. The charging circuit 402 is used to control the total number of phases used for diode braking for each transient event, and the digital rotator/counter block 401 determines which phase is allowed to turn on its body diode (e.g., apply diode braking).

The transient detector 300 provides the DB_EN signal to an input of a digital rotator/counter block 401, which also receives power stage temperature information at another input, and binary or digital inputs provided at corresponding outputs of the ADC 409. In the illustrated embodiment, the ADC 409 is a 3-bit device receiving a voltage DBLIM and providing a digital representation of DBLIM, shown as DBLIM_D, which includes three digital values (or binary values each having logic states 0 or 1). The resolution of the ADC 409, and thus the number of bits of DBLIM_D, may be based on the number of phases of the applicable multiphase regulator (e.g., 100). The digital rotator/counter block 401 outputs a separate enable signal for each phase of the regulator for enabling diode braking. In the illustrated embodiment, 4 phases are implemented and the digital rotator/counter block 401 outputs the four phase diode enable signals DB1, DB2, DB3 and DB4. The digital rotator/counter block 401 also outputs a current control signal VDS.

The charging circuit 402 includes a current source 403, a capacitor C1, and a voltage controlled current sink 407. The current source 403 is shown referenced to a maximum voltage level (e.g., VCMAX) and provides a current I1 to a charge node 405 for charging the capacitor C1, which is coupled between node 405 and GND. The charge node 405 develops the DBLIM voltage which is provided to an input of the ADC 409. The output digital signal DBLIM_D from the ADC 409 is provided to respective inputs of the digital rotator/counter block 401. The voltage controlled current sink 407 is coupled between node 405 and GND and sinks a controlled current I2 from the capacitor C1 via node 405 based on the current control signal VDS provided from the digital rotator/counter block 401.

In one embodiment, the current source 403 provides relatively constant current I1 to the charge node 405 for charging the capacitor C1 to develop the DBLIM voltage provided to the ADC 409. In one embodiment, the current I1 goes to zero when DBLIM reaches VCMAX, so that DBLIM has an upper limit of VCMAX. In an alternative embodiment, the current source 403 may be replaced by a pull-up resistor to pull the voltage of DBLIM to VCMAX. Alternatively, DBLIM may not have a predetermined limit since the ADC 409 has a digital limit. DBLIM may have a lower voltage limit (e.g., GND). The ADC 409 converts the voltage of DBLIM to the digital value DBLIM_D provided to the digital rotator/counter block 401. The digital rotator/counter block 401 outputs VDS provided to the controlled current sink 407. The current sink 407 draws the current I2 from the capacitor C1 to reduce the voltage of DBLIM. In one embodiment, the magnitude of I2 varies with the magnitude of VDS, in which VDS has a lower voltage limit to reduce I2 to a very low or zero level. The digital rotator/counter block 401 asserts the diode control signals DB1-DB4 based on the DBLIM_D value.

In the illustrated embodiment, the ADC 409 is shown with a resolution of 3 bits for indicating up to four phases when at least one phase is on during any given cycle. An ADC with additional bits may be used to support a larger number of phases. As shown in FIG. 4, 3 bits are used for four phases which allows for an additional zero state when none of the diodes are on for a given cycle such as shown in FIG. 2 (e.g., number of indicated phases is 0, 1, 2, 3 or 4). In one embodiment, DBLIM has a voltage level ranging between minimum and maximum voltage levels (e.g., between GND and VCMAX), which is divided into voltage sub-ranges based on the number of phases of the regulator. For example, the minimum level of DBLIM may correspond with the zero level of DBLIM_D and the maximum level may correspond with the total number of phases, such as 4. The voltage level of DBLIM is inversely related to the rate of repetitive load transients, in which the higher the rate of repetitive load transients, the lower the voltage level of DBLIM. The value of DBLIM_D provides a limit on the number of phases for application of diode braking. Thus, as the rate of repetitive load transients increases, DBLIM_D decreases so that diode braking is applied to a decreased number of phases.

Figure 5:
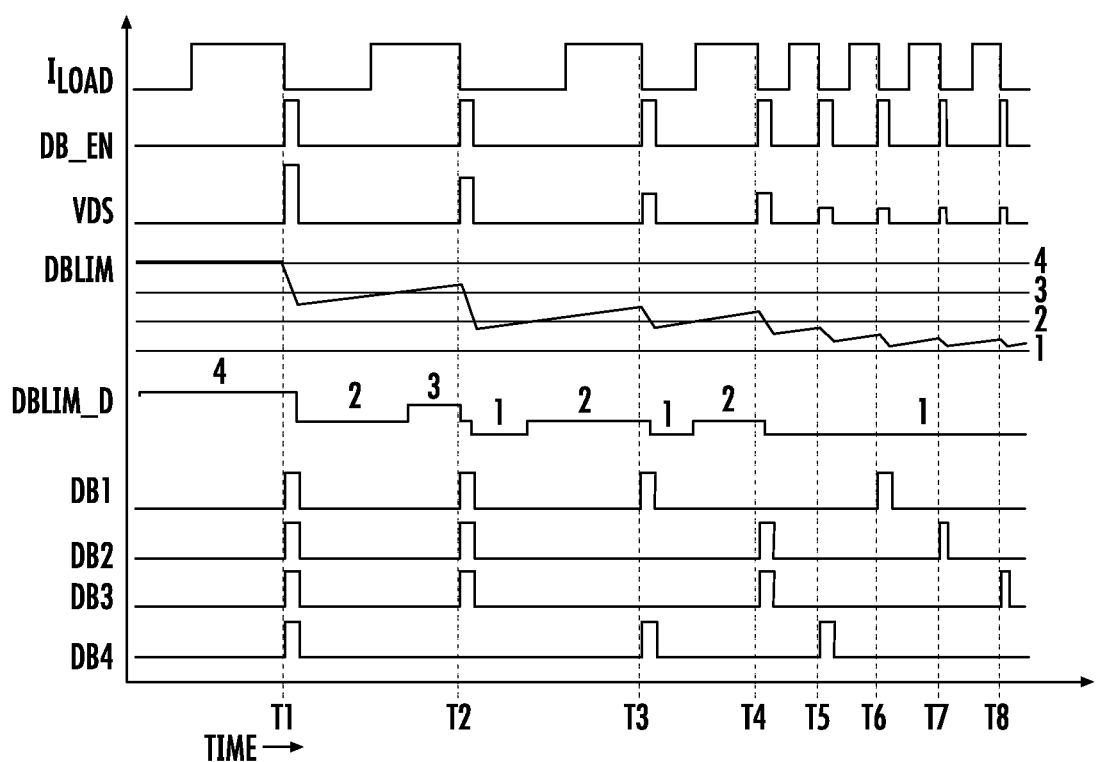
FIG. 5 is a timing diagram illustrating operation of the intermittent diode braking control block of FIG. 4 according to one embodiment.

FIG. 5 is a timing diagram illustrating operation of the intermittent diode braking controller 103 as illustrated in FIG. 4 including the digital rotator/counter block 401 according to one embodiment. The load current $I_{LOAD}$ of the voltage regulator (e.g., voltage regulator 100) is plotted at the top, followed by signals DB_EN, VDS, DBLIM, DBLIM_D and DB1-DB4. DBLIM_D indicates the voltage level of DBLIM relative to 4 voltage levels 1-4. The 4 voltage levels are sized approximately equally in one embodiment. DBLIM_D is 4 if DBLIM is at or above level 4 (e.g., VCMAX), DBLIM_D is 3 if DBLIM is between levels 3 and 4, DBLIM_D is 2 if DBLIM is between levels 2 and 3, DBLIM_D is 1 if DBLIM is between levels 1 and 2, and DBLIM_D is 0 if DBLIM is less than 1. In one embodiment, the minimum voltage level is below level 1 and the ADC output has an 0 output indicating that no phase diodes are turned on.

$I_{LOAD}$ toggles between low load and high load with increasing frequency over time. The current source 403 continuously charges the capacitor C1 with current I1 until DBLIM saturates at its maximum level (e.g., VCMAX). A pulse occurs on DB_EN for each transient load release, and has a pulse duration indicative of a relative strength the of load release event. The digital rotator/counter block 401 pulses VDS concurrent with each pulse of DB_EN, and in which each VDS pulse has substantially the same duration as the corresponding DB_EN pulse. Also, the magnitude of each VDS pulse is proportional to the number of phase diodes that are turned on, which is controlled by DBLIM_D. At an initial time t1 for a first DB_EN pulse, DBLIM_D is 4 resulting in a highest magnitude of the corresponding VDS pulse. At subsequent time t2 for a second DB_EN pulse, DBLIM_D is 3 resulting in a slightly lower magnitude VDS pulse. At subsequent times t3 and t4 for the next two DB_EN pulses, DBLIM_D is 2 resulting in an even lower magnitude VDS pulses. At subsequent times t5-t8 for corresponding DB_EN pulses, DBLIM_D is 1 resulting in relatively low magnitude VDS pulses. If the magnitude of the current I2 is proportional to the magnitude of the corresponding VDS pulse, the corresponding reduction of the voltage level of DBLIM is also proportional to the magnitude of the corresponding VDS pulse.

Each pulse of VDS controls the current sink 407 to draw current I2 from the capacitor C1 to pull the voltage of DBLIM lower. As shown, with each pulse of VDS, DBLIM ramps down at a rate proportional to the current difference (I2-I1) for the duration of the VDS pulse, in which I2 is proportional to the magnitude of the VDS pulse. After completion of each pulse on VDS, I2 is low or zero so that DBLIM ramps back up at a rate determined by the level of I1. DBLIM_D is a digital representation of DBLIM, and the digital rotator/counter block 401 uses DBLIM_D to determine the number of phase diodes to be activated during diode braking operation.

At initial time t1 the repetitive rate of load current transitions is relatively low so that diode braking is applied to the four phases. Between times t1 and t2, DBLIM_D drops to 2 but rises back up to 3 at time t2, so that a selected 3 phases are turned on at time t2. As shown, diode braking is applied to phases 1, 2 and 3 in which diode braking for phase 4 is skipped. At time t3, DBLIM_D indicates 2 phases so that a selected 2 phases are turned on, such as phases 1 and 4. At time t4, DBLIM_D indicates 2 phases again so that another selected 2 phases are turned on, such as phases 2 and 3. Phase groupings may be arbitrarily determined and alternated at a given frequency level as previously described. From time t5 forward, the toggling of $I_{LOAD}$ appears to remain relatively constant in which 1 phase is on for each of times t5, t6, t7 and t8. As the frequency of the repetitive rate transient events of the load current increases, diode braking is applied only to 3 phases at time t2, to only 2 phases at times t3 and t4, and then to only 1 phase for each of subsequent times t5-t8. Diode braking application is rotated between phases 1-4 at times t5-t8 as shown.

In one embodiment, if the rate of load transients is sufficiently low, such as below a first rate level, then the DBLIM voltage is allowed to rise back to its maximum level between consecutive load transient events. In that case, diode braking is not reduced and is thus applied to each phase below the first rate level. When the repetitive rate rises above the first rate level but is below a second rate level, then DBLIM decreases and application of diode braking is dropped for one phase. If the rate stays between the first and second rate levels, then one dropped phase is rotated among the phases as previously described. When the repetitive rate rises above the second rate level but is below a third rate level, then DBLIM decreases further and application of diode braking is dropped for two phases, and two dropped phases are rotated among the phases as previously described. When the repetitive rate rises above the third rate level but is below a fourth rate level, then DBLIM decreases further and application of diode braking is dropped for three phases and three dropped phases are rotated among the phases as previously described. In the 4 phase case, for example, diode braking is applied only to one phase and diode braking is rotated among the 4 phases.

In some embodiments, diode braking may be further reduced in which only one phase diode is turned on for multiple transient events. Continuing the above embodiment, for example, when the repetitive rate rises above the fourth rate level but is below a fifth rate level, then application of diode braking may be reduced and applied to only one phase for every 2 transient events. For example, between the fourth and fifth rate levels, only a first phase diode is turned on for a first load transient event, none of the phase diodes are turned on for a second load transient event, only a second phase diode is turned on for a third load transient event, and so on. When the repetitive rate rises above the fifth rate level but is below a sixth rate level, then application of diode braking may be reduced and applied to only one phase for every 3 transient events in similar manner, and diode braking is applied to only one phase for every 3 transient events. A maximum rate level may be reached such that diode braking is turned off completely.

The particular rate levels depend upon the particular configuration and implementation. In the embodiment illustrated in FIGS. 4 and 5, several different factors, such as the pulse magnitudes, the current levels (e.g., I1 and I2), the capacitance value of C1, the voltage range of DBLIM, among others, are determined to achieve the desired level of intermittent diode braking for a particular multiphase voltage regulator.

In a more specific embodiment, for example, the first rate level is approximately 10 KHz, the second rate level is approximately 30 KHz, the third rate level is approximately 60 KHz, the fourth rate level is approximately 100 KHz, the fifth rate level is approximately 200 KHz, and the sixth rate level is approximately 500 KHz. In a 4 phase regulator case, for example, diode braking is not reduced below a load transient repetitive rate of 10 KHz, diode braking is reduced to three phases for a load transient repetitive rate between 10 KHz and 30 KHz, diode braking is reduced to two phases for a load transient repetitive rate between 30 KHz and 60 KHz, diode braking is reduced to only one phase for a load transient repetitive rate between 60 KHz and 100 KHz, diode braking is reduced to only 1 phase for every 2 transient events for a load transient repetitive rate between 60 KHz and 100 KHz, and diode braking is reduced to only 1 phase for every 3 transient events for a load transient repetitive rate between 100 KHz and 500 KHz. These rate levels are based on a specific implementation so that other rate levels and rate ranges may apply for different configurations. Also, different and/or additional rate levels may be defined or otherwise determined.

In summary, as the frequency of the repetitive load transient events of the load current increases, the number of phases for diode braking is reduced such that one or more phases are omitted. The omitted phases for diode braking are rotated over time to distribute energy among the phase switches.

In high repetitive rate load transient events, the output voltage overshoot can be minimized when applying a higher voltage across the output inductor to speed up the inductor current reduction during the freewheeling period of the voltage regulator. This can be achieved by turning off the low side switch for a duration (Td) before the inductor current reduces to zero. During this duration, the current goes through the body diode of low side switch, thus, the sum of the output voltage and the body diode drop of low side switch (VOUT+ $V_{DIODE}$) applies to the output inductor. As described herein for a multiphase converter, diode braking is reduced during high repetitive rate load transients which effectively reduces the body braking frequency on each switch, which in turn results in much less power dissipation of each switch.

In addition, the diode turn-on duration and repetitive rate can be adjusted based on the real operational temperature to prevent over-heating issue. With reference to the intermittent diode braking controller 103 of FIG. 4, the power stage temperature is provided as another input to the digital rotator/counter 401. As temperature rises above a certain predetermined threshold level, the digital rotator/counter 401 correspondingly increases the magnitude of VDS to correspondingly reduce the application of diode braking.

Figure 6:
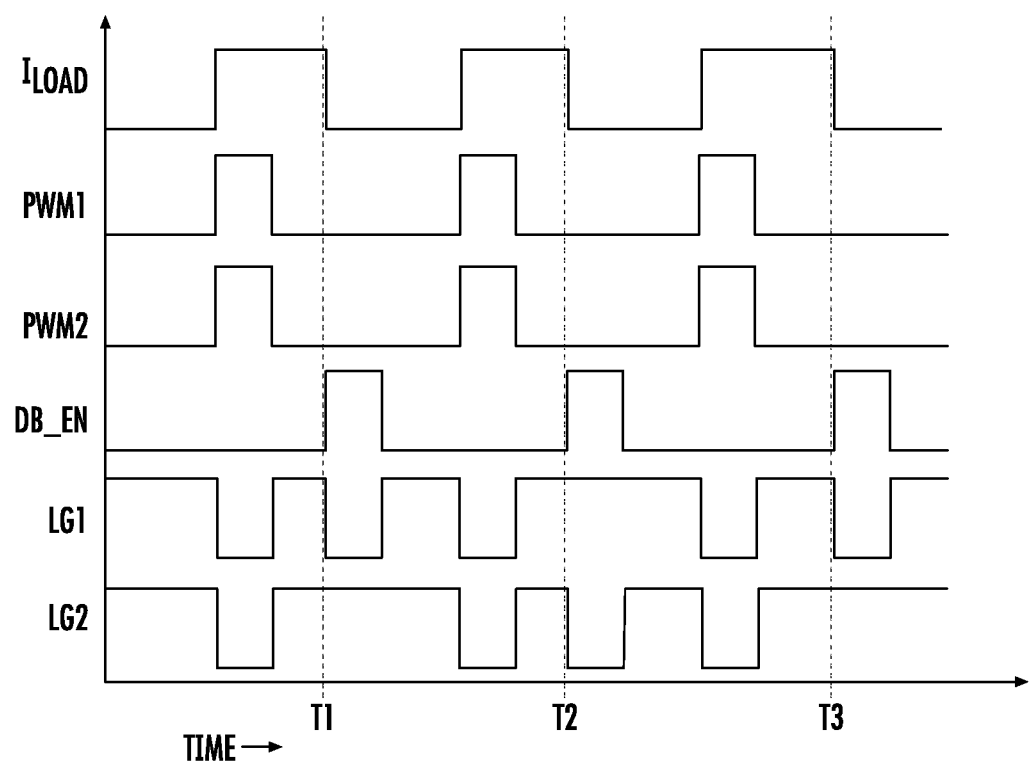
FIG. 6 is a simplified timing diagram illustrating intermittent diode braking according to one embodiment for a two phase regulator.

FIG. 6 is a simplified timing diagram illustrating intermittent diode braking according to one embodiment for a two phase regulator. $I_{LOAD}$ is plotted along with signals PWM1, PWM2, DB_EN, LG1 and LG2 versus time. PWM1 is a pulse-width modulation signal for the first phase and PWM2 is the PWM signal or the second phase. LG1 is the gate drive signal for controlling the lower electronic switch of the first phase and LG2 is the gate drive signal for controlling the lower electronic switch of the first phase. When the gate drive signal is high for a given switch, the switch is turned on and diode braking is off. When the gate drive signal pulses low when it would normally be high between PWM pulses, diode braking is activated. $I_{LOAD}$ transitions at a sufficiently high rate for activation of diode braking reduction, and DB-EN pulses high at times t1, t2 and t3.

As shown in FIG. 6, the lower switches of both phases are turned on since LG1 and LG2 are both initially high prior to time t1 after the first pulses of PWM1 and PWM2 for both phases. The DB_EN pulse at time t1 results in LG1 being pulled low for the duration of the DB_EN pulse while LG1 remains high. Thus, diode braking is omitted for phase 2 at time t1. Both LG1 and LG2 are high after the second pulses of PWM1 and PWM2 at time t2 when the second DB_EN pulse occurs. In this case, LG1 remains high while LG2 goes low for the duration of the DB_EN pulse. Thus, diode braking is omitted for phase 1 at time t2. Both LG1 and LG2 are high after the third pulses of PWM1 and PWM2 at time t3 when the third DB_EN pulse occurs. In this case, LG2 remains high while LG1 goes low for the duration of the DB_EN pulse. Thus, diode braking is omitted for phase 2 at time t3. Operation repeats in this manner at the given rate of load transients. FIG. 6 illustrates that turning on the phase diode of a phase results in turning off the lower switch (thus turning on its body diode) when the switch would otherwise be on.

Figure 7:
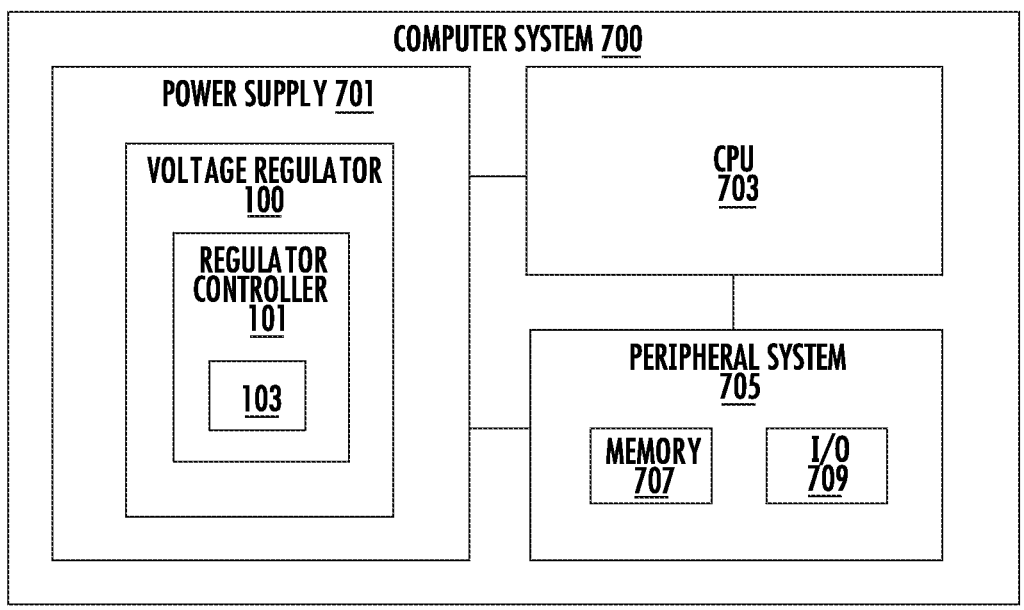
FIG. 7 is a simplified block diagram of a computer system configured with a power supply configured to perform intermittent diode braking according to one embodiment of the present invention.

FIG. 7 is a simplified block diagram of a computer system 700 configured with a power supply 701 configured to perform intermittent diode braking according to one embodiment of the present invention. As shown, for example, the power supply 701 may including the voltage regulator 100 incorporating the regulator controller 101, which further includes the intermittent diode braking controller 103. The power supply 701 develops at least one supply voltage (e.g., VOUT) which provides power to other system devices of the computer system 700. In the illustrated embodiment, the computer system 700 includes a CPU 703 and a peripheral system 705, both coupled to receive supply voltages from the power supply 701. In the illustrated embodiment, the peripheral system 705 may include any combination of a system memory 707 (e.g., including any combination of RAM and ROM type devices and memory controllers and the like), and an input/output (I/O) system 709, which may include system controllers and the like, such as graphic controllers, interrupt controllers, keyboard and mouse controllers, system storage device controllers (e.g., controllers for hard disk drives and the like), etc. The illustrated system is exemplary only, since many of the CPU system and support devices may be integrated onto the CPU chip as understood by those skilled in the art.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A method of operating a regulator controller for performing intermittent diode braking for controlling a multiple phase voltage regulator having a total number of phases, said method comprising:

receiving at least one signal for detecting repetitive load transients;

determining a rate of the repetitive load transients;

generating a plurality of diode braking control signals, each for applying diode braking to a corresponding one of the total number of phases for at least one load transient when a rate of the repetitive load transients are below a first rate; and controlling the plurality of diode braking control signals to drop application of diode braking of at least one phase for at least one load transient when the rate of the repetitive load transients are at least the first rate.

2. The method of claim 1, wherein said controlling the plurality of diode braking control signals further comprises controlling the plurality of diode braking control signals to rotate application of diode braking among the total number of phases during successive applications of diode braking.

3. The method of claim 1, wherein said controlling the plurality of diode braking control signals to drop application of diode braking of at least one phase comprises controlling the plurality of diode braking control signals to drop application of diode braking of an increased number of phases when the rate of repetitive load transients is increased, and further comprising controlling the plurality of diode braking control signals to rotate application of diode braking for the increased number of phases among the total number of phases during successive applications of diode braking.

4. The method of claim 1, wherein said controlling the plurality of diode braking control signals to drop application of diode braking of at least one phase comprises:
dropping application of diode braking by one phase when the rate of the repetitive load transients are at least the first rate and less than a second rate which is greater than the first rate; and
dropping application of diode braking by two phases when the rate of the repetitive load transients are at least the second rate.

5. The method of claim 1, wherein said controlling the plurality of diode braking control signals to drop application of diode braking of at least one phase comprises controlling the plurality of diode braking control signals to drop application of diode braking of only one phase for every occurrence of a consecutive number of repetitive load transients when the rate of the repetitive load transients is at least a second rate which is greater than the first rate.

6. The method of claim 5, further comprising controlling the plurality of diode braking control signals to rotate application of diode braking to only one phase for every occurrence of a consecutive number of repetitive load transients among the total number of phases.

7. The method of claim 1, wherein said receiving at least one signal for detecting repetitive load transients comprises receiving and monitoring transitions of an output voltage of the multiple phase voltage regulator and generating and monitoring transitions of a compensation voltage which is indicative of an error of the output voltage.

8. The method of claim 1, wherein said determining a rate of the repetitive load transients comprises:
continuously charging a capacitor at a first charge rate;
discharging the capacitor by at least a second charge rate which is greater than the first charge rate upon each load transient event; and
converting a voltage of the capacitor to a limit number indicative of a number of phases for application of diode braking.

9. An intermittent diode braking system for a regulator controller which controls a multiple phase voltage regulator having N phases, said intermittent diode braking system comprising:
a transient detector that provides a transient indication which is indicative of load transients of the voltage regulator;
a timing network which determines a rate of said load transients based on said transient indication and which provides a limit value indicative thereof; and
a controller which controls diode braking for the voltage regulator based on said limit value, wherein said controller applies diode braking to each of the N phases for at least one load transient when said limit value is at a first level, and wherein said controller applies diode braking to less than the N phases for at least one load transient when said limit value is less than said first level.

10. The intermittent diode braking system of claim 9, wherein said transient detector provides a plurality of pulses each indicative of a corresponding load transient.

11. The intermittent diode braking system of claim 10, wherein said transient detector asserts each of said plurality of pulses upon detection of a load release, and de-asserts each of said plurality of pulses upon detection of a response by the voltage regulator.

12. The intermittent diode braking system of claim 9, wherein the regulator controller receives a signal indicative of an output voltage and develops a compensation voltage indicative of an error of the output voltage, and wherein said transient detector comprises:
a logic device having an output providing a plurality of pulses each indicative of a corresponding load transient, which asserts each of said plurality of pulses when set and which de-asserts each of said plurality of pulses when reset;
a first logic gate which sets said logic device upon occurrence of either one of the output voltage increasing to at least a first predetermined threshold and the compensation voltage falling below a second predetermined threshold; and
a second logic gate which resets said logic device upon occurrence of either one of the output voltage reaching a peak level and the compensation voltage rising above said second predetermined threshold.

13. The intermittent diode braking system of claim 9, wherein said timing network comprises:
a capacitor coupled between a reference node and a charge node providing a limit voltage;
a converter which converts said limit voltage to said limit value;
a current source charging said capacitor with a charge current; and
a current sink which discharges said capacitor with a discharge current which is based on said transient indication.

14. The intermittent diode braking system of claim 13, wherein:
said transient detector provides a plurality of transient pulses each indicative of a load release event;
wherein said controller receives said plurality of transient pulses and provides a corresponding plurality of control pulses to a voltage control input of said current sink; and
wherein said current sink generates said discharge current based on said plurality of control pulses.

15. The intermittent diode braking system of claim 14, wherein said controller adjusts a magnitude of said plurality of control pulses based on said limit value, and wherein said current sink adjusts a magnitude of said discharge current based on said magnitude of said plurality of control pulses.

16. The intermittent diode braking system of claim 9, wherein said controller further rotates application of diode braking among the N phases during successive applications of diode braking when said controller applies diode braking to less than the N phases.

17. The intermittent diode braking system of claim 9, wherein said limit value comprises a plurality of discrete levels which decrease from said first level to a last level, and wherein said controller drops application of diode braking by one phase when said limit value is decreased to each of said plurality of discrete levels.

18. A processing system, comprising:
an error amplifier which receives a signal indicative of an output voltage and which develops a compensation voltage indicative of error of said output voltage;
a modulator which develops a plurality of pulse control signals, each for a corresponding one of the multiple phases;
a plurality of gate drivers, each receiving a corresponding one of the plurality of pulse control signals for developing a corresponding one of a plurality of gate drive signals, and each receiving a corresponding one of a plurality of diode braking signals for temporarily de-asserting a corresponding gate drive signal;

an intermittent diode braking network, comprising:
- a transient detector that provides a transient indication which is indicative of load transients of the voltage regulator;
- a timing network which determines a rate of said load transients based on said transient indication and which provides a limit value indicative thereof; and
- a diode braking controller which provides said plurality of diode braking signals based on said limit value, wherein said diode braking controller asserts each of said plurality of diode braking signals for at least one load transient when said limit value is at a first level, and wherein said diode braking controller asserts less than all of said plurality of diode braking signals for at least one load transient when said limit value is less than said first level.

19. The processing system of claim 18, wherein said transient detector provides said transient indication based on detected changes of said output voltage and detected changes of said compensation voltage.

20. The processing system of claim 18, wherein said diode braking controller further rotates application of diode braking among the multiple phases during successive applications of diode braking when said diode braking controller applies diode braking to less than all of the phases.

21. The processing system of claim 18, wherein said limit value comprises a plurality of discrete levels which decrease from said first level to a last level, and wherein said diode braking controller drops application of diode braking by one phase when said limit value is decreased to each of said plurality of discrete levels.

22. The processing system of claim 18, wherein said error amplifier, said modulator, and said intermittent diode braking network are provided on a regulator controller integrated circuit.

23. The processing system of claim 18, further comprising a plurality of switching networks, wherein each of said plurality of switching networks comprises an upper switch, a lower switch and an inductor, and wherein said plurality of switching networks are controlled by said plurality of gate drive signals for converting an input voltage to said output voltage.

24. The processing system of claim 18, further comprising at least one central processing unit and at least one memory device coupled to receive said output voltage as a supply voltage.

25. An intermittent diode braking controller for a multiple phase voltage regulator having N phases, said intermittent diode braking controller comprising:
- means to detect a repetition frequency of load release type load transients; and
- means to adjust a number of the N phases to which diode braking is applied at each occurrence of said load release type load transients based on said repetition frequency.

* * * * *